May 26, 1936.  E. PRAETORIUS ET AL  2,041,953
SELF GENERATING PHOTOELECTRIC CELL
Filed Aug. 30, 1932
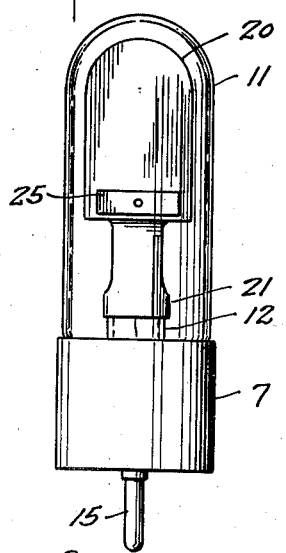
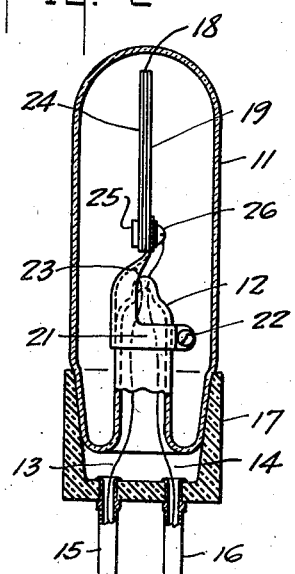
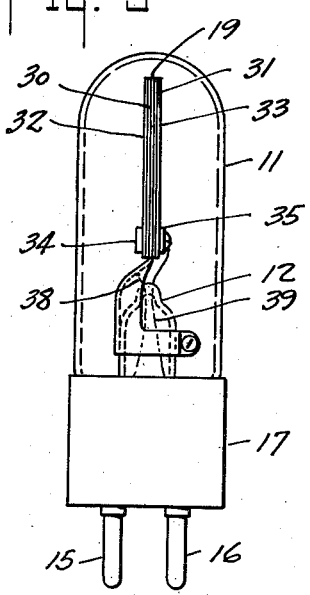
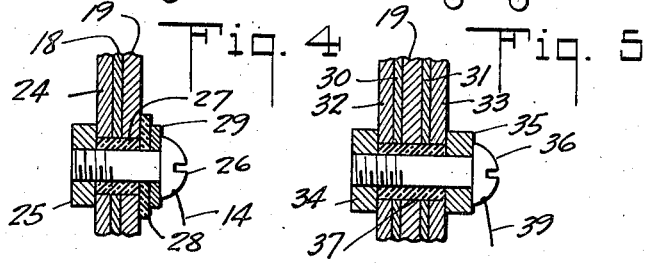
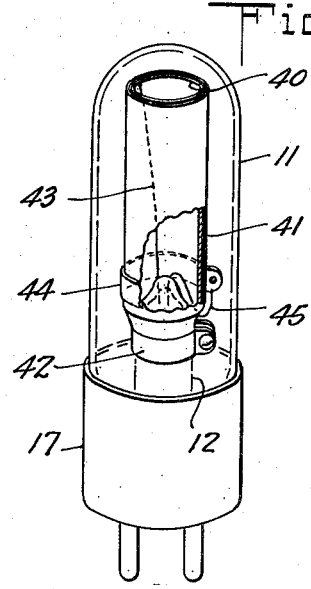
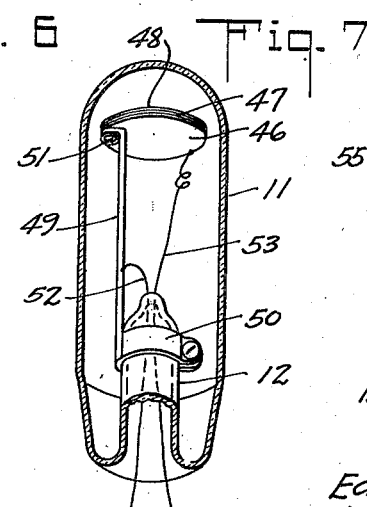
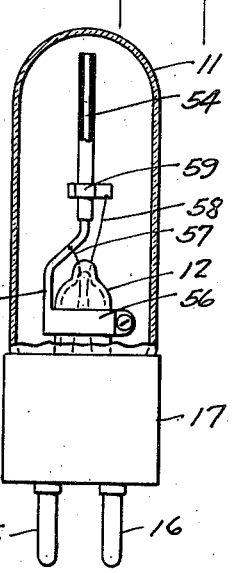
INVENTORS
Edward Praetorius
John E. Stewart
BY John Flam
ATTORNEY

UNITED STATES PATENT OFFICE 2,041,953

SELF-GENERATING PHOTOELECTRIC CELL

Edward Praetorius and John E. Stewart,
Los Angeles, Calif.

Application August 30, 1932, Serial No. 631,018

1 Claim. (Cl. 136—89)

This invention relates to photoelectricity; and more particularly to a device that can translate light energy into electrical energy.

Devices that respond electrically to light and light impulses are of course well-known. Among several such common types is the so-called selenium cell, the resistance of which is reduced when light radiations fall thereon. Such a cell however is sluggish and fails to respond instantaneously to variations in light intensity. Furthermore, it requires the use of an extraneous source of electrical energy; and lastly, the amplitude of variation in resistance is small as compared with the absolute resistance when no light is being received.

In another type of device, an alkali coated cathode, and an anode are enclosed in an evacuated container, and when light impulses reach the alkali coating, electrons are emitted therefrom and are received on the anode. This space current thus formed is caused to vary in accordance with light intensity, because the volume of electrons released increases with an increase in illumination.

This type of cell also requires a source of electrical energy to make the anode electrically positive with respect to the cathode, so that the electrons may be attracted to the anode. Furthermore, the total maximum space current in such a cell is very limited, and is of the order usually of one or two micro-amperes.

It is one of the objects of the present invention to provide a photoelectric device that generates its own electrical energy, making its operation independent of extraneous sources of electrical energy or potential. In other words, it is possible, by the aid of this invention, directly to transform light energy into electrical energy at a surprisingly high degree of efficiency. For example, tests of these cells show that for each square inch of the active element exposed to direct sunlight, the cell can easily develop a current of several milliamperes and a potential difference of .15 volt. This represents power that is very great as compared with the usual type of light responsive devices, and therefore no great amount of amplification is necessary to provide a practical and commercial system for such purposes as sound reproduction or any other purpose for which light responsive devices are or may be used. The cell operates in direct proportion to the intensity of illumination incident upon its active surface. Furthermore, its "dark current" is zero; that is, no electrical current flows when the cell is in perfect darkness.

We have found that these highly desirable effects can be readily attained by a particular treatment of the element selenium. It is true that there have been scientific papers written, and research conducted, indicating that all light sensitive devices using selenium, such as selenium bridges and selenium cells, are merely light-resistive and not truly photoelectric. This is certainly true of all selenium devices which are in use today, as all such common devices, when placed in circuit with an appropriate source of energy, merely have the property of varying their internal ohmic resistance over a more or less wide range in accordance with the amount of illumination falling on them, and thereby varying the amount of electricity flowing through them from the battery which is in circuit.

There are however a few instances, in the extensive literature on selenium, where reference is made to the observation of the generation of electricity by selenium in response to illumination and without the aid of an extraneous source. Thus as early as 1888, W. von Uljanin, writing in volume 34, of the year 1888, pages 241 to 273 in Wiedeman's Annalen der Physik, observed and recorded that in his selenium cells or bridges, a strong electromotive force was produced in illumination (without any externally applied electromotive force), amounting in sunlight to 0.12 volt. The direction of this E. M. F. corresponded to current in the direction of the transmitted beam of light.

A collection of references relating to this same phenomenon can be found in an article entitled "The photo E. M. F. in selenium" by Robert L. Hanson, pages 370 et seq. of the Journal of the American Optical Society, volume 18, May, 1929. He there refers to even earlier experimenters, such as Adams and Day, who observed in 1876, that in certain cases a cell upon being illuminated by limelight exhibited a current without the aid of an external battery. Other early references are also included in this Hanson article.

It is another object of this invention to adapt this form of photoelectric cell to provide a thoroughly reliable and permanent construction, whereby the self-generating property in selenium may be obtained without fail in every case, and whereby it may therefore be utilized in a practical manner both for commercial purposes and for scientific purposes.

Our invention possesses many other advantages, and has other objects which may be made more easily apparent from a consideration of several embodiments of our invention. For this purpose we have shown a few forms in the drawing accompanying and forming part of the present specification. We shall now proceed to describe these forms in detail, which illustrate the general principles of our invention; but it is to be understood that this detailed description is not to be taken in a limiting sense, since the scope of our invention is best defined by the appended claim.

Referring to the drawing:

Figure 1 is an elevation of a photoelectric device embodying the invention;

Fig. 2 is a longitudinal sectional view thereof;

Fig. 3 is a view similar to Fig. 2, but showing a modified construction;

Fig. 4 is a detail section showing one mode in which the connections can be made in the form shown in Fig. 2;

Fig. 5 is a detail section showing a similar construction as Fig. 4, but adapted for the form shown in Fig. 3;

Figs. 6 and 7 are perspective views of two further modified forms of the invention;

Fig. 8 is an elevation, partly broken away, of still another form of the invention.

It is preferable, although not essential, to provide a hermetically sealed envelope for the cell; such an envelope can be a glass bulb 11. By enclosing it in this manner, especially in an atmosphere of reducing gas, such as hydrogen, carbon monoxide, acetylene, methane, dry hydrogen chloride, or ethylene, the active element can be maintained fully operative for an indefinite period. The pressure in the vessel 11 can be, and preferably is of the order of atmospheric pressure, that is, from about 500 to 800 millimeters of mercury. This bulb 11 has a reentrant press or stem portion 12, serving as a support for substantially all the elements mounted inside the tube. Furthermore, the conductors 13 and 14 to the active elements can be sealed through this stem. They can be joined to the inside of hollow prongs 15, 16 fastened to a conventional base 17 of insulation material. The lower end of vessel 11 can be cemented, in any appropriate manner, to the inside of the base 17. Since this mode of constructing tubes of various kinds is now well known, such as for electric lamps and for electronic emission devices, further description of the mechanical features of the vessel 11 and its support is considered unnecessary.

The active element is a selenium layer 18 (Figs. 2 and 4) treated or prepared in a particular manner as hereinafter described. This layer is in electrical contact with a metal plate 19, which forms a cathode. The thickness of the selenium layer 18 is greatly exaggerated, since it does not usually exceed .005 inches; and plate 19 can be appropriately formed as by stamping, from mild steel sheets, the thickness of which can be of the order of .018 inches. In order to appreciate the dimensions of one practical form of cell, this plate 19, the form of which is shown at 20 in Fig. 1, can have about one square inch of surface over which the selenium layer is attached.

The plate 19 can be provided with a clamping ring 21, telescoping over stem 12, and tightened as by the clamp screw 22. In this manner, the metal cathode 19 and the various layers thereon, can be supported inside of vessel 11. One of the connections, such as 13, can be attached directly to plate 19, as indicated at 23. This can be accomplished as by soldering.

Covering the selenium layer 18 is a layer 24, also shown as exaggerated in thickness. In the actual process described layer 24 is very much thinner than the layer 18, but is shown thick for clarifying the drawing. This layer 24 is a special conducting layer in intimate electrical contact with the layer 18 and so attenuated that it is capable of transmitting light to the contiguous surface of the selenium 18. The specific character and mode of application of this layer 24 will be hereinafter described.

The lead 14 may be connected to the layer 24, in a manner shown most clearly in Fig. 4. Thus, in contact with the exposed surface of layer 24 is a rectangular conducting strip 25. A screw 26 extends through layers 24 and 18, and plate 19, and is threaded into the plate. This screw, however, is insulated from layer 18 and plate 19, so that current can flow from one lead to the other only by way of the layers 18 and 24. This insulation is effected by providing an insulation bushing 27 around screw 26, which bushing extends through all of the layers and plate 19. An insulation washer 28 is disposed around screw 26 and is placed next to plate 19. An ordinary metal washer 29 can if desired, be provided over the insulation washer. Lead 14 can be soldered to the head of screw 26, whereby this lead is placed in contact with layer 24, through the screw 26 and plate 25.

When leads 13, 14 are connected through a closed circuit externally of tube 11, and if layers 18 and 24 are prepared in the particular manner hereinafter defined, a very substantial potential difference can be obtained across these leads in response to the illumination cast on layers 24 and 18. This potential difference, of the order of .15 volt, is sufficient to cause a current flow of several milliamperes. The electrical power represented by this potential difference and current flow is a true conversion of light into electricity. In these cells, there is no variation in the resistance of the selenium in response to light variation, and they therefore are not to be confused with the old and well-known forms of variable resistance cells.

The manner in which the electrode assembly 19—18—24 is prepared will now be detailed. After the plate 19 is stamped, they are placed in any kind of an acid or alkaline electrolyte bath, attached to the anode side of an electroplating circuit for a few minutes, and subjected to an electroplating current. This treatment removes the high polish of the sheet steel and instead leaves a soft matt surface. It is then removed from the electrolytic bath, washed in water and dried. The plate is then quickly brought to a temperature above the melting point of selenium and sufficiently high to provide chemical combination of iron and selenium; that is, to about 300° centigrade, and at the same time, pure vitreous selenium is directly applied to the area of the plate desired to be covered, in a smooth even layer of about .008 inch thick. This pure vitreous selenium is a non-crystalline solid, and ultimately forms the active layer 18.

The matt surface of the iron plate 19 enters into intimate chemical combination with the selenium at the temperature prescribed (300° centigrade), creating at the contacting surfaces, a junction of iron selenide (FeSe and FeSe$_2$) between the iron cathode and the selenium layer. This causes the selenium to adhere very firmly and with perfect electrical contact. This chemical bonding is one of the essential features to make the cell self-generating. The bond thus formed is an electronic barrier layer between the selenium and the back electrode, whereby it is possible to secure the self-generating effect. Just as soon as the selenium has spread on the iron cathode, it is rapidly cooled to prevent the selenium from crystallizing. This can be accomplished by placing the uncoated side of the cathode plate 19 on a thick copper plate at room temperature, which rapidly conducts the heat away from the iron cathode and leaves the selenium in the vitreous or non-crystalline form.

The iron cathode plate 19 with its attached vitreous selenium is now placed in a suitable metal die or jig, capable of bringing pressure on the surface of the selenium. This is in preparation for an annealing process and for the application of the thin front layer 24 to the selenium layer. The formation of this layer 24 is accomplished by first taking a sheet of ground glass of the same shape as the plate 19, and evenly rubbing over the matt surface of the glass, some powdered amorphous carbon or graphite. Other matt surfaces besides a ground glass surface could be used, but such a ground glass surface has been found entirely satisfactory. The transfer of the finely divided carbon and the transformation of the selenium from the vitreous to a crystalline form, rendering it sensitized, are all preferably accomplished simultaneously in the actual process.

The shaped sheet of ground glass thus coated with the amorphous carbon, is placed against the selenium, as soon the the selenium is brought to room temperature, the carbon side being in contact with the selenium. By the aid of the jig, a suitable spring pressure is brought to bear on this glass plate. The amount of pressure determines the thickness of the finished sensitive layer 18. A pressure of from 30 to 50 pounds per square inch will reduce the thickness of the selenium to the desired value of .005 inches, from an initial thickness of .008 inches. The surplus selenium is squeezed out between the edges of the plates superposed in the die or jig. The assembly of the selenium coated cathode-plate, amorphous carbon coated glass plate, and the pressure jig is now placed in any suitable oven or furnace and brought as rapidly as possible to the stationary temperature of 200° centigrade and held there for about fifteen minutes. This entire heating or annealing process from the time the cold jig is inserted into the oven to the time it is removed therefrom, need not require more than fifteen minutes, provided the jig is brought up to a temperature of 200° centigrade within five or ten minutes. In that case, keeping the temperature at 200° centigrade for the balance of the fifteen minute interval is sufficient to "anneal" the vitreous selenium, and to transfer the amorphous carbon coating from the ground glass onto the selenium. This amorphous carbon coating is represented by layer 24, and is so thin that it is capable of transmitting light to the selenium. At the expiration of fifteen minutes, the jig is removed from the oven or furnace and allowed to cool to room temperature at a natural rate, and not quickly.

Due to this treatment, the selenium layer 18 attains a perfectly flat, regular and uniform surface, and a thickness of .005 inches; and the amorphous carbon layer 24 is entirely transferred from the ground glass plate to the selenium surface, and is in partial chemical combination with the selenium. This film or layer 24 serves as a semi-transparent conducting electrode or anode for the cell. When light (or generally, visible radiations) strikes the amorphous carbon layer 24, the light penetrates through to the surface layer of the sensitized selenium, and by virtue of the inherent property of this selenium, this layer 18 generates an E. M. F. in proportion to the intensity of the illumination, which may reach the magnitude of .015 volt in direct sunlight. This E. M. F. is electro-positive at the iron cathode 19, and electronegative at the amorphous carbon anode 24.

The multiple layer element 19—18—24 can be now installed in the vessel 11. The contact plate 25 as heretofore mentioned, is applied, and can be made from such metals as copper, brass or molybdenum.

We have found that, for best results, the layer 18 of sensitized selenium, in its completed form, should not exceed .005 inches in thickness, nor be less than .003 inches.

The cathode plate assembly can take various other forms besides the flat form of Figs. 1 and 2; and various other modifications can be resorted to.

In the modification shown in Figs. 3 and 5, the iron or steel cathode plate 19 is coated on both sides with sensitized selenium 30 and 31, prepared in the same way as just described. Over each of these layers is disposed the corresponding amorphous carbon layer 32 or 33. In this case, two contactor bars 34 and 35 are required, one for each sensitive side of the plate, held together by a screw 36, passing through the insulation bushing 37. A lead wire 38 can be fastened to plate 19, and another wire 39 to screw 36. Thus both amorphous carbon layers 32, 33 are directly connected to this screw, and form one pole of an electric circuit, the other pole being formed by the center plate 19. This form of cell may be used for example for simultaneously comparing two separate sources of light, photometrically.

In Fig. 6 there is another modification shown. In this case the iron or steel plate forming the cathode is in the form of a cylinder 40. It is covered on its entire outer surface with a sensitized layer .005 inches thick of selenium prepared as heretofore described. In this case of course, the heating die must conform to the cylindrical conformation of cathode 40. Over the selenium layer, and in an exposed position, is an outer layer 41 of amorphous carbon as heretofore described.

The cylinder 40 is provided with a clamping collar 42 for supporting it on the press or stem 12. One connecting wire, such as 43, can be soldered to the interior of cylinder 40, and thus corresponds to lead 13 of Fig. 2. The carbon layer 41 is in contact with a metal clamp ring 44, to which the other lead 45 is connected, said lead 45 corresponding to wire 14 of Fig. 2.

In this form of the cell, it is sensitive to illumination reaching it at any angle to the axis of cylinder 40. In other words, it may be termed a "see all around" cell.

To adapt the device for "end exposure" only, a modification such as shown in Fig. 7 can be used. In this instance, the iron or mild steel plate 46, corresponding to cathode plate 19, is in the form of a thin disc, the sensitive surface of which is direct. 1 toward the end of the tube 11. Over this thin disc is a layer of sensitized selenium 47, which is covered with an amorphous carbon film 48, all as heretofore described. In this case, the disc 46 is supported on a crimped metal bar 49, terminating in an integral supporting clamp 50. A screw 51 fastens the bar 49 to the disc 46, but is not in electrical contact with the disc or bar. Instead it serves as a contact to the layer 48 in a manner similar to that illustrated in Fig. 4, the contact plate analogous to plate 25 being obscured from view by disc 46. Lead wire 52 is fastened as by soldering, to bar 49, and is therefore in electric contact through screw 51 with the exposed surface of the carbon layer 48. The other lead wire 53 can be soldered directly to the back of disc 46.

If it is desired to provide a minimum area of sensitive surface, exposed in practically line form, use can be made of the form shown in Fig. 8. In this form, the cathode is a thin iron wire 54, supported on stem 12 as by the offset portion 55 and clamp collar 56 attached to this portion 55. The straight part of the wire 54 is coated all around with the .005 inch thick layer of sensitized selenium, and an exterior coating of amorphous carbon, all prepared as heretofore specified. One lead 57 is connected to cathode 54 as by soldering it directly to an uncoated portion thereof. The other lead 58 is soldered to a ring 59 that is permanently clamped over the exposed amorphous carbon layer.

We claim:

In a selenium self-generating photo-electric device, containing two interfaces or electron barrier planes: a thin layer of light-sensitive crystalline selenium, a back-supporting plate electrode of iron (cathode), a chemical bond between the selenium and the iron plate, said bond constituting a reverse interface or reverse electron barrier plane of iron selenide; a front translucent electrode of finely divided graphite (anode), and a chemical bond between the selenium and the front electrode, said bond constituting an obverse interface or obverse electron barrier plane of carbon selenide.

EDWARD PRAETORIUS.
JOHN E. STEWART.